Oct. 23, 1951 W. H. ROBERTS 2,572,663
ATTACHMENT FOR CAPACITOR WINDING MACHINES
Filed Sept. 15, 1949
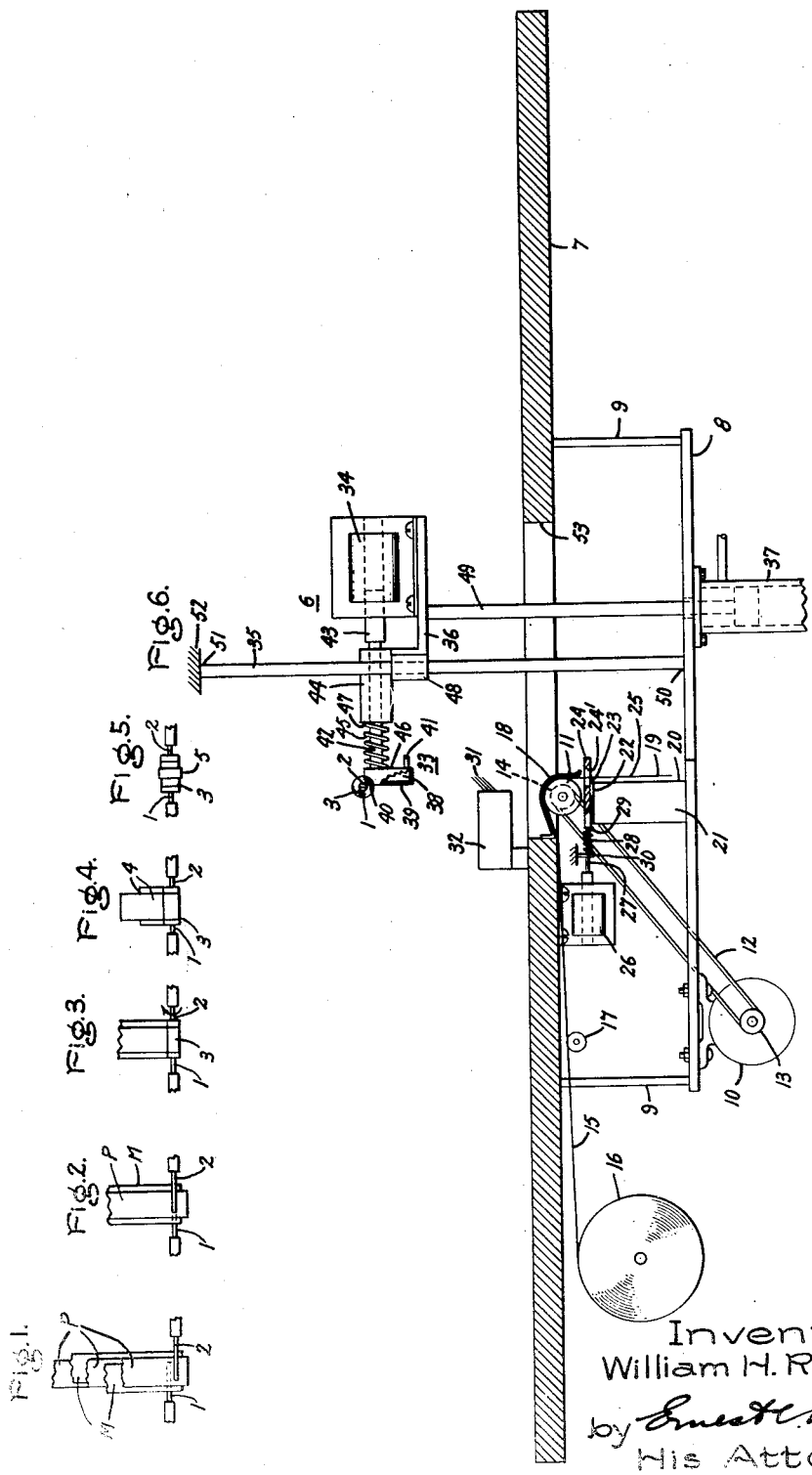
Inventor:
William H. Roberts,
by Ernest H. Britton
His Attorney.

Patented Oct. 23, 1951

2,572,663

UNITED STATES PATENT OFFICE

2,572,663

ATTACHMENT FOR CAPACITOR WINDING MACHINES

William H. Roberts, Cheshire, Mass., assignor to General Electric Company, a corporation of New York Application September 15, 1949, Serial No. 115,940

1 Claim. (Cl. 216—25)

This invention relates to attachments for capacitor winding machines and more particularly to an automatic tape applicator attachment for causing a strip of adhesive tape to be automatically wound on a capacitor roll to secure the loose ends thereof.

In capacitor winding machines, webs of paper and metal foil are moved from reels through guides and the ends positioned adjacent one to the other between two sections of a split mandrel. The sections of the mandrel are then closed and rotated to produce a wound capacitor roll thereon after which the webs are severed leaving a plurality of loose ends of webs on the wound capacitor roll.

It is an object of this invention to provide an automatic tape applicator attachment to be used with and controlled by such a capacitor winding machine to cut lengths of gummed tape from a reel supplying a web of the same, wet each length of gummed tape and apply it to a rotating wound capacitor roll to cause the length of tape to wrap around the roll and secure the loose ends thereof.

It is a further object to provide an attachment which is simple, reliable, and readily adaptable as an attachment to winding machines of the type described.

It is a still further object to provide an automatic tape applicator attachment to be used with and controlled by a capacitor winding machine to cut lengths of tape from a roll supplying webs of the same, apply an adhesive substance to one surface of the tape and apply the cut length of tape to a rotating wound capacitor roll to cause the length of tape to wrap around the roll and secure the loose ends thereof.

It is also an object to provide an automatic tape applicator attachment to be used with and controlled by a capacitor winding machine to cut lengths of thermal adhesive tape from a reel supplying webs of the same, heat each cut length of tape to cause the same to become adhesive, and apply the length of tape to a rotating wound capacitor roll to cause the length of tape to wrap around the roll and secure the loose ends thereof.

In general, my invention consists of an attachment for capacitor winding machines having a winding mandrel mounted above a table, the attachment comprising a cutting member, means for moving a web of tape to a position adjacent the cutting member to cut a length of tape from the web, means for treating a surface of the length of tape to cause it to become adhesive, and means for applying the length of adhesive tape to a rotating wound capacitor roll on the rotating mandrel to cause the length of tape to wrap around the wound capacitor roll and secure the loose ends thereof.

For a complete understanding of my invention, reference should be had to the following specification and the accompanying drawing in which Figs. 1–5 are diagrammatical views of portions of a conventional winding machine showing successive steps in the winding of a capacitor roll and are used to aid in explaining my invention, and Fig. 6 is a diagrammatical view showing the application of my invention to a conventional capacitor winding machine, limited portions of the winding machine being shown in diagrammatical form.

Referring to the drawing in detail, I have shown in Fig. 1 a plurality of webs of metal foil M and paper P positioned between two mandrel sections 1 and 2 of a conventional capacitor winding machine (not shown). The webs of paper and metal foil have been moved by conventional means to the position shown in Fig. 1 from reels (not shown) of paper and metal foil.

After the webs of paper and metal foil are assembled as shown in Fig. 1, the mandrel sections 1 and 2 are closed on the webs of paper and metal foil to hold the same between the mandrel sections 1 and 2, as shown in Fig. 2, and the mandrel sections are rotated in unison, as shown in Fig. 3, to wind the paper and metal foil into a wound capacitor roll 3. The webs of paper and metal foil are then severed by conventional means to leave a plurality of loose ends 4 of paper and metal foil on the roll 3, as shown in Fig. 4.

To prevent the wound capacitor roll from unwinding when it is removed from the mandrel sections 1 and 2, it is desirable to secure the loose ends 4 of paper and metal foil to the roll 3. This may be done in a conventional manner by stopping the rotation of the mandrel sections 1 and 2 and wrapping a length of gummed tape 5 by hand on the roll 3 to secure the loose ends thereof, as shown in Fig. 5. Such an operation, however, is time consuming and limits the production of the winding machine.

Therefore, in accordance with one aspect of my invention, to increase the production of a capacitor winding machine, I provide an automatic tape applicator attachment 6, as shown in Fig. 6, to be attached to and controlled by a conventional capacitor winding machine of the type described to automatically apply a length of gummed tape to a wound capacitor roll in cooperative time sequence with the operations of the winding machine and thereby reduce the time required for this operation. In Fig. 6, I have shown only the mandrel sections 1 and 2 and a table 7 of a conventional capacitor winding machine as the remaining portions of the machine are not necessary to an understanding of my invention.

The attachment 6 comprises a flat plate 8 of steel or other suitable material rigidly supported below the table 7 of a capacitor winding machine by suitable supporting members 9 rigidly connecting the plate 8 and table 7. Adjustably supported below the plate 8, I provide a drive motor 10 arranged to drive a friction roller 11 made of rubber or other suitable material through a belt 12 and pulleys 13 and 14 or other suitable means. The roller 11, when driven, moves a web of gummed tape 15 from a reel 16 through guides 17 and 18. Guide 18 exerts a force on the tape 15 to force the tape against the roller 11 and cause the tape to be moved by friction produced between the tape and roller 11. Guide 18 also directs an end portion 19 of tape 15 along a flat vertical face 20 of a support member 21 mounted on the plate 8 below the roller 11, as shown in Fig. 6.

Mounted on the support member 21 in a position between the roller 11 and the support member 21 is a shear member 22 having a cutting edge 23 facing and adjacent to the end portion 19 of tape 15. To cut a length of gummed tape 25 from the web of tape 15, a cutting member 24 having a cutting edge 24' is arranged for horizontal movement and slidable engagement with the shear member 22. Thus, upon horizontal movement to the left of the cutting member 24, the cutting edges 23 and 24' cooperate to cut a length of gummed tape 25 from the web 15.

To impart horizontal motion to the cutting member 24, a solenoid 26, connecting member 27, and compression spring 28 are provided as shown in the drawing. Solenoid 26 is connected to the cutting member 24 by the connecting member 27 to move the cutting member to the left when the solenoid 26 is energized thereby also compressing spring 28 between an adjacent surface 29 of the cutting member 24 and a stationary member 30. To return the cutting member 24 to its original position, the energy stored in spring 28 upon compression is released by de-energizing the solenoid 26 and the spring 28 forces the cutting member 24 to the right.

To wet a length of the gummed tape 25 before it is applied to the wound capacitor roll 3 shown positioned on the mandrel sections 1 and 2, a wetting member such as a wick 31 protruding from a water container 32 or any other suitable wetting device is supported in fixed position above the roller 11 and substantially in the same vertical plane therewith.

To move the length of gummed tape 25 from a position adjacent surface 20 of support member 21, wet the length of gummed tape 25 on the wick 31 and apply the wetted tape to the wound capacitor roll 3, I provide in the automatic tape applicator attachment 6 an applicator member 33, a solenoid 34, a pair of vertical guide members 35, a rider platform 36 and a double acting air cylinder 37. The applicator member 33 comprises a hollow housing 38 having a perforated face 39 and a recessed portion 40 curved to conform approximately to the outer periphery of the roll 3. An air pump and hose or other suitable equipment (not shown) are connected to the housing 38 at outlet 41 to withdraw air from the housing and thereby create a suction through the perforated face 39. The reason for this will become evident in a later portion of my disclosure explaining the operation of the automatic tape applicator attachment 6. The applicator member 33 is rigidly connected to a shaft 42 which connects to an armature 43 of the solenoid 34 and the solenoid is mounted in a horizontal manner on the rider platform 36, as shown in Fig. 6. The shaft 42 is rectangular in cross section and is slidably positioned in a guide block 44 which is secured to the rider member 36. To impart a reciprocal horizontal motion to the applicator member 33, a compression spring 45 is mounted on the shaft 42 and between adjacent surfaces 46 of the applicator member 33 and 47 of the guide block 44, as shown in Fig. 6, to cooperate with the solenoid 34 in producing this motion. That is, when the solenoid 34 is energized, the armature 43 is drawn into the solenoid, thus moving the applicator member 33 to the right and the spring 45 is compressed between surfaces 46 and 47. When the solenoid 34 is de-energized, the applicator member 33 is moved to the left in response to the force of the compressed spring 45.

To provide for reciprocal vertical movement of the applicator member 33, the rider platform 36 is slidably connected to the vertical guide members 35 by a connecting member 48, as shown in Fig. 6, or by other suitable means, and a rod 49 is connected between the rider platform 36 and the air cylinder 37 which is arranged for vertical movement of the rod 49. The guide rods 35 are supported for vertical position by having one pair of adjacent ends 50 thereof rigidly connected to plate 8 and the opposite ends 51 thereof rigidly connected to a stationary member 52. A rectangular aperture 53 of suitable size is provided in the table 7, as shown in Fig. 6, to accommodate the rods 35 and permit the passage therethrough of the rider platform 36 and associated mechanism.

In operation, when the capacitor winding machine is ready to wind a capacitor roll 3 on the mandrel sections 1 and 2 and winding of the roll 3 is begun, the rider platform 36, solenoid 34 and tape applicator member 33 are in a lowered position, the platform 36 resting on the plate 8, and the solenoid 34 is energized thereby holding applicator member 33 in a retracted position adjacent the solenoid 34. As the capacitor winding machine operates the portion 19 of the web of tape 15 is moved by the roller 11 to a vertical hanging position adjacent the flat surface 20 of support member 21. The solenoid 34 is then de-energized to release the tape applicator member 33 and allow it to be moved to the left in response to the compression of spring 45. In so moving the perforated face 39 of the tape applicator member 33 is moved into engagement with the hanging portion 19 of the gummed tape 15 and presses the same against the flat surface 20 of support member 21. The solenoid 26 is then momentarily energized to operate the cutting member 24 to cut a length of gummed tape 25 from the web of tape 15 in cooperation with the shear member 22. At the same time, air is withdrawn from the housing 38 of the tape applicator member 33 to create a suction through the apertured face 39 thereof and cause the length of gummed tape 25 to adhere to the tape applicator member 33.

The solenoid 34 is then re-energized to move the applicator member 33 to the right to its retracted position and at the same time the air cylinder 37 is operated to move the rider platform 36, solenoid 34 and applicator member 33 upward until the applicator member 33 with the length of gummed tape 25 attached thereto is in a position slightly below the wick 31. Thereafter, as the rider platform is moved upward, the solenoid 34 is de-energized to allow the applicator member 33 to move to the left to wipe the length of gummed tape 25 on the wick 31 and thereby wet the gummed surface thereof. Thereafter, as the rider platform continues its upward movement, the solenoid is re-energized to retract the applicator member 33. By the time the applicator member has reached a position opposite the roll 3, the roll has been wound, the paper and metal foil cut by operations of the winding machine and the roll is being rotated by the mandrel sections 1 and 2 with the loose ends of the roll ready to be taped.

To wind the wetted length of gummed tape 25 on the wound roll 3, the solenoid 34 is de-energized and the tape applicator member 33 moves to the left to press the wetted tape on the rotating wound roll 3. As soon as contact is made between the tape and the roll, the suction on the perforated face 39 of the tape applicator member 33 is released to allow the tape to wrap around the roll 3. The curved recess portion 40 of the face 39 guides the tape as it is wrapped around the rotating wound capacitor roll 3.

The rotation of the mandrel sections 1 and 2 is then stopped. The wound and taped roll is ejected by operations of the capacitor winding machine and the winding of a new capacitor roll is begun, thereby eliminating the time otherwise required for hand taping. In the meantime, the rider platform 36 with its associated solenoid and tape applicator member is lowered to its original position and a new winding and taping cycle is begun.

An advantage of the above tape applicator attachment is its adaptability to conventional capacitor winding machines to decrease the inactive time of the machine otherwise required to tape the capacitor roll by hand.

Another advantage of the attachment lies in the fact that it applies an adhesive tape to the wound capacitor roll which better secures the loose ends thereof than such conventional means as spraying a liquid glue on the wound roll.

A further advantage of the attachment is its simple structure and reliable operation.

A still further advantage of my attachment is its adaptability to be used with different types of tape. For example, a plain untreated roll of paper tape can be substituted for the gummed tape 15 if glue is substituted for water in the container 32. The glue is applied to the tape after it has been picked up by the applicator member 33. This arrangement is particularly advantageous where it is desirable to use a glue that is not water solvent.

While I have shown and described particular embodiments of my invention, it will be obvious to those skilled in the art that various changes and modifications may be made without departing from my invention in its broader aspects and I, therefore, aim in the appended claim to cover all such changes and modifications as fall within the true spirit and scope of my invention.

What I claim as new and desire to secure by Letters Patent of the United States is:

An automatic tape applicator attachment for a capacitor roll winding machine having a table with an opening therein and a winding mandrel above the table for winding a plurality of webs of paper and metal foil into a capacitor roll comprising a mounting plate connected to and supported by said table in a fixed horizontal position below said table, a support member having a vertical plane surface mounted on said mounting plate below said winding mandrel, friction means for moving a web of gummed tape to a vertical position adjacent said vertical plane surface of said support member, severing means to sever a vertically disposed portion of said gummed tape from said web, a wetting means positioned intermediate and in substantial vertical alignment with said vertical plane surface of said support member and said winding mandrel, vertical guide rods extending from said mounting plate vertically through the opening in said table, said guide rods being spaced from and positioned opposite said winding mandrel, said wetting means and said vertical plane surface; a rider member slidably connected to said guide rods for vertical movement thereon through said opening in said table to positions opposite said vertical plane surface, said wetting means and said mandrel; an applicator member slidably mounted on said rider for horizontal motion with respect thereto and with respect to said guide rods, said applicator member comprising a hollow housing a wall of which is a vertically disposed perforated surface, a spring biased to slidably and horizontally move said applicator toward said support member when said rider member is opposite thereto whereby a portion of gummed tape vertically disposed adjacent said vertical plane surface is pressed between said perforated surface of said applicator and said vertical plane surface of said support member, a solenoid mounted on said rider member and connected to said applicator member to draw said applicator away from said support member against the biasing action of said spring, means for releasably withdrawing air from said hollow housing to create a suction through said perforated surface to cause a length of gummed tape to adhere thereto upon severing of said tape by said severing means and withdrawal of said applicator away from said support member by said solenoid and a double acting air cylinder connected to said rider member and adapted to move said rider member and a severed portion of gummed tape adhered to said applicator into engagement with and over said wetting means to a position opposite said mandrel for engagement of said tape with a capacitor rolled on said mandrel under the biasing action of said spring upon the de-energization of said solenoid.

WILLIAM H. ROBERTS.

REFERENCES CITED

The following references are of record in the file of this patent:

UNITED STATES PATENTS

| Number | Name | Date |
|---|---|---|
| 1,033,968 | Waldron | July 30, 1912 |
| 2,185,399 | Carr et al. | Jan. 2, 1940 |
| 2,213,109 | Spievak | Aug. 27, 1940 |
| 2,395,125 | Kile et al. | Feb. 19, 1946 |